United States Patent
Wright

(10) Patent No.: US 7,287,364 B2
(45) Date of Patent: Oct. 30, 2007

(54) FENCE MOWER

(76) Inventor: Larry D. Wright, 1218 Pinsonfork Dr., Spring, TX (US) 77379

(*) Notice: Subject to any disclaimer, the term of this patent is extended or adjusted under 35 U.S.C. 154(b) by 0 days.

(21) Appl. No.: 11/166,664

(22) Filed: Jun. 24, 2005

(65) Prior Publication Data

US 2006/0288679 A1    Dec. 28, 2006

(51) Int. Cl.
*A01D 75/18* (2006.01)

(52) U.S. Cl. .................................................. 56/10.4

(58) Field of Classification Search ............... 56/10.4, 56/229, 255, 15.2, 14.9, 15.6, 15.7, 15.8, 56/233, DIG. 14; 144/34.1, 302, 24.12
See application file for complete search history.

(56) References Cited

U.S. PATENT DOCUMENTS

| | | | |
|---|---|---|---|
| 2,052,802 A | | 9/1936 | Schatz |
| 2,314,215 A | | 3/1943 | Hilblom |
| 3,115,739 A | * | 12/1963 | Thoen ............................... 56/6 |
| 3,241,302 A | * | 3/1966 | Barry .......................... 56/13.6 |
| 3,439,683 A | * | 4/1969 | Keller ........................... 460/13 |
| 3,526,083 A | * | 9/1970 | Watson et al. ................ 56/10.7 |
| 3,797,209 A | * | 3/1974 | Davis .......................... 56/13.6 |
| 4,104,851 A | * | 8/1978 | Perry .......................... 56/10.4 |
| 4,206,580 A | * | 6/1980 | Truax et al. .................. 56/10.4 |
| 4,432,192 A | * | 2/1984 | Maier et al. .................. 56/15.3 |
| 4,573,306 A | | 3/1986 | Smith et al. |
| 4,802,327 A | | 2/1989 | Roberts |
| 4,901,508 A | | 2/1990 | Whatley |
| 5,035,107 A | | 7/1991 | Scarborough |
| 5,050,372 A | | 9/1991 | Heiskell |
| 5,065,566 A | * | 11/1991 | Gates .......................... 56/12.7 |
| 5,367,862 A | * | 11/1994 | Spear et al. .................. 56/12.7 |
| 5,471,824 A | | 12/1995 | Neely |
| 5,704,201 A | * | 1/1998 | Van Vleet ..................... 56/14.9 |
| 5,960,614 A | * | 10/1999 | Jones .......................... 56/15.2 |
| 6,182,428 B1 | | 2/2001 | Hatfield |

(Continued)

*Primary Examiner*—Árpád Fábián Kovács
(74) *Attorney, Agent, or Firm*—William S. Dorman

(57) ABSTRACT

A fence mower comprising a base frame connected to an agricultural tractor, a swing away cutting and dirt removal arm mounted by a pivot pin to the base frame to produce a mower assembly which is free floating by being connected to the agricultural tractor using a 3-point hitching system. Power to the invention is supplied by the tractor's power take off by way of a power take off shaft connected to a right angle gear box mounted on the swing away cutting arm. Through a pulley system, power is delivered to a spindle with a cutting and dirt removal blade attached on the bottom side. The swing away cutting and dirt removal arm is designed to extend beyond the side of the tractor, thus allowing the arm to be positioned under the last, or bottom fence rail closest to the ground of a fence. As the operator of the tractor engages the power take off, power generated is distributed to the cutting blade previously positioned under the fence line. As the tractor moves forward in a line parallel to the fence line, the invention cuts and also removes surface dirt in its path of travel until it comes in contact with a fixed fence post. Upon contact with the fixed fence post, the swing arm automatically moves around the post allowing the tractor to continue moving in a straight line parallel to the fence line. As the swing arm clears the fixed fence post, it automatically repositions itself under the fence line using assistance of a wedge nose design and adjustable spring system.

3 Claims, 4 Drawing Sheets

U.S. PATENT DOCUMENTS 6,662,835 B1 * 12/2003 Gengler .................... 144/34.1
6,804,941 B2    10/2004 Washburn
2004/0045268 A1 *  3/2004 Nafziger .................... 56/10.4

* cited by examiner

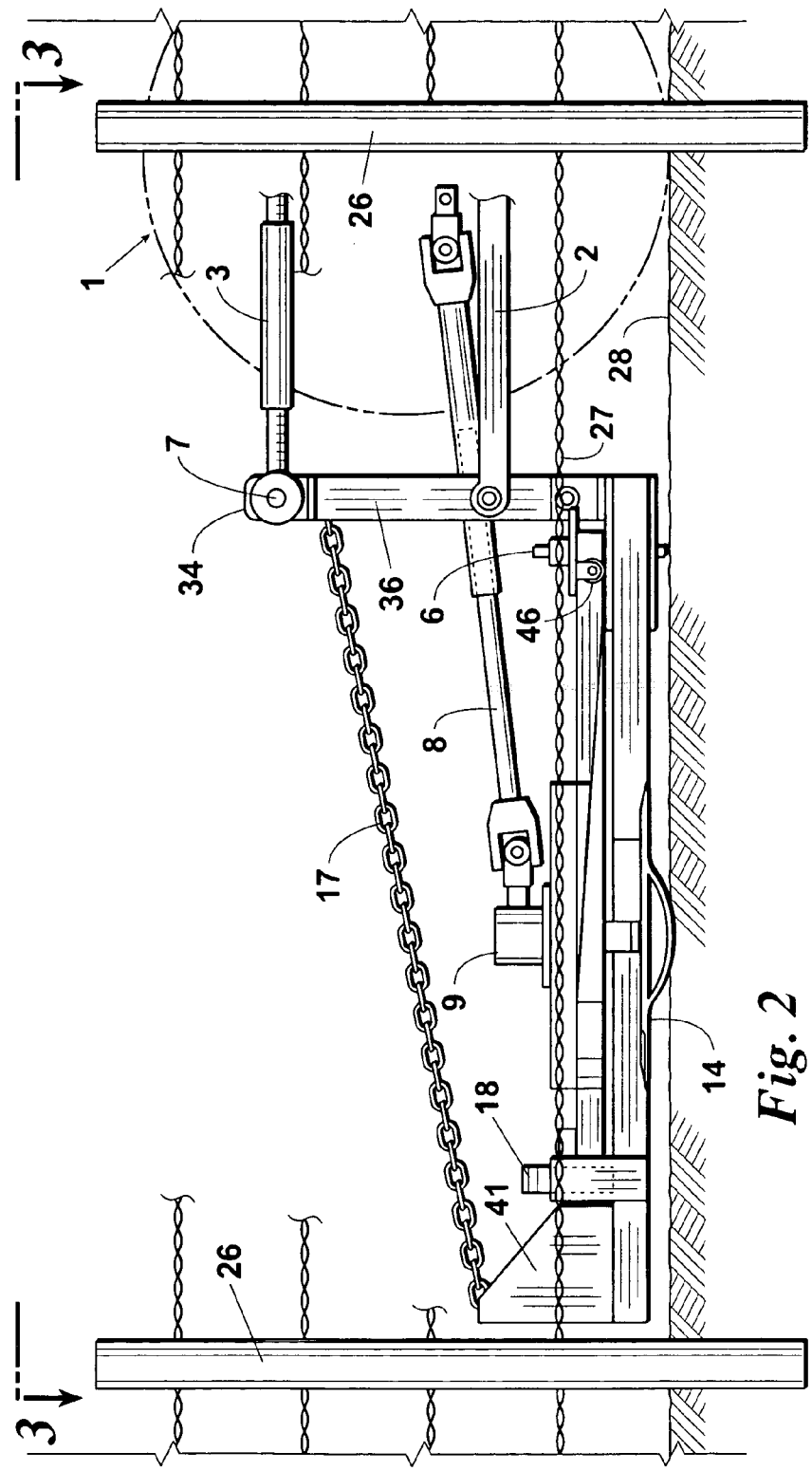
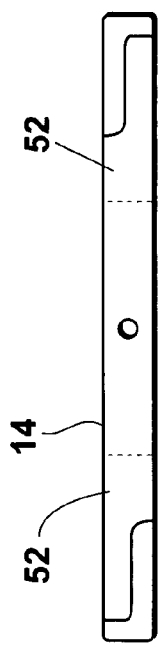
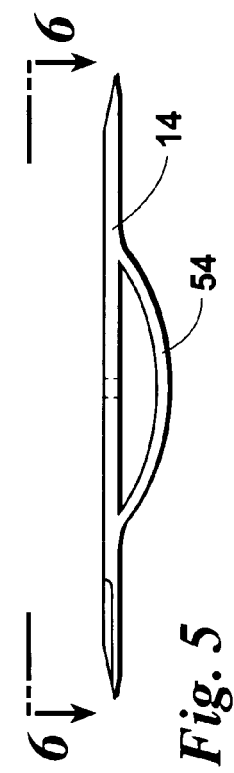

＃ FENCE MOWER

BACKGROUND OF THE INVENTION

1. Field of the Invention

The present invention relates to a powered mowing machine which is provided as an attachment to an agricultural tractor. More particularly, the present invention provides that the cutting attachment is connected to the rear of the agricultural tractor by means of a conventional 3-point hitch. The cutting attachment is a free floating device suspended above and parallel with the ground, such that the operator of the tractor can freely move the cutting attachment under a fence.

2. Prior Art

Various machines are used to cut vegetation under fence lines, some of which are pulled, and some designed to be attached to agricultural tractors.

One such apparatus is shown in U.S. Pat. No. 2,314,215 by Hilblom. In this apparatus, Hilblom uses a caster wheel on the frame end to follow the ground level and support the weight of the cutter.

In U.S. Pat. No. 4,432,192 by Maier et al, there is shown a latching mechanism for a swing arm.

In U.S. Pat. No. 4,573,306 by Smith et al, Smith uses a gearing system to power multiple cutters.

In U.S. Pat. No. 5,035,107 by Scarborough, the design uses a two mower system, one of which is a trimmer which swings away when it comes in contact with an object or fence post.

In U.S. Pat. No. 5,471,824 by Neely, the design uses flexible cutting material along with casters to keep the invention from contacting the ground.

U.S. Pat. No. 6,182,428 by Hatfield is a gasoline powered invention with a string line cutting system pulled by an All Terrain Vehicle or tractor.

In U.S. Pat. No. 6,804,941 by Washburn, a gasoline engine powers the swing away cutting system which is supported by the use of casters.

U.S. Pat. No. 2,052,802 to Schartz; Is a weed and vine cutter in which Schartz uses a rotating disc as a cutter. He tilts the disc (as if plowing a field) and cuts below the surface of the ground thus severing the roots of weeds or vines. He supports his invention using a caster wheel, and the device is powered by a chain drive system.

Roberts U.S. Pat. No. 4,802,327; In this patent, Roberts is using a rotating chain saw blade which is guarded on the outside diameter, with some of the rotating chain exposed for cutting.

U.S. Pat. No. 4,901,508 to Whatley. Whatley uses a plurality of horizontal rotating blades, each mounted on a vertical stub axis and arranged in a circular array such that when a fence post is encountered, the mechanism rotates around the post.

U.S. Pat. No. 5,050,372 to Heiskell. Heiskell uses a flexible reinforced rubber as his cutting blade.

SUMMARY OF THE INVENTION

A swing away cutting and dirt removal arm, mounted by a pivot pin to a base frame which is free floating and attached to an agricultural tractor using a 3-point hitching system. Power to the invention is supplied by the tractor's power take off by way of a power take off shaft connected to a right angle gear box mounted on the swing away cutting arm. Through a pulley system, power is delivered to a spindle with a cutting and dirt removal blade attached on the bottom side.

The swing away cutting and dirt removal arm is designed to extend beyond the side of the tractor, thus allowing the arm to be positioned under the last, or bottom fence rail closest to the ground. As the operator of the tractor engages the power take off, power generated is distributed to the cutting blade previously positioned under the fence line. As the tractor moves forward in a line parallel to the fence line, the invention cuts and also removes surface dirt in its path of travel until it comes in contact with a fixed fence post. Upon contact with the fixed fence post, the swing arm automatically moves around the post allowing the tractor to continue moving in a straight line parallel to the fence line. As the swing arm clears the fixed fence post, it automatically repositions itself under the fence line using assistance of a wedge nose design and adjustable spring system.

BRIEF DESCRIPTION OF THE DRAWINGS

FIG. 2 is a side elevation of the mowing attachment showing its relation to an agriculture tractor and a portion of a fence under whose lowermost rail or strand the invention is designed to cut;

FIG. 5 is a side elevation of the cutting and dirt removal blade associated with the present invention;

FIG. 6 is a plan view of the blade shown in FIG. 5.

DETAILED DESCRIPTION OF THE PREFERRED EMBODIMENTS

Figure 1:
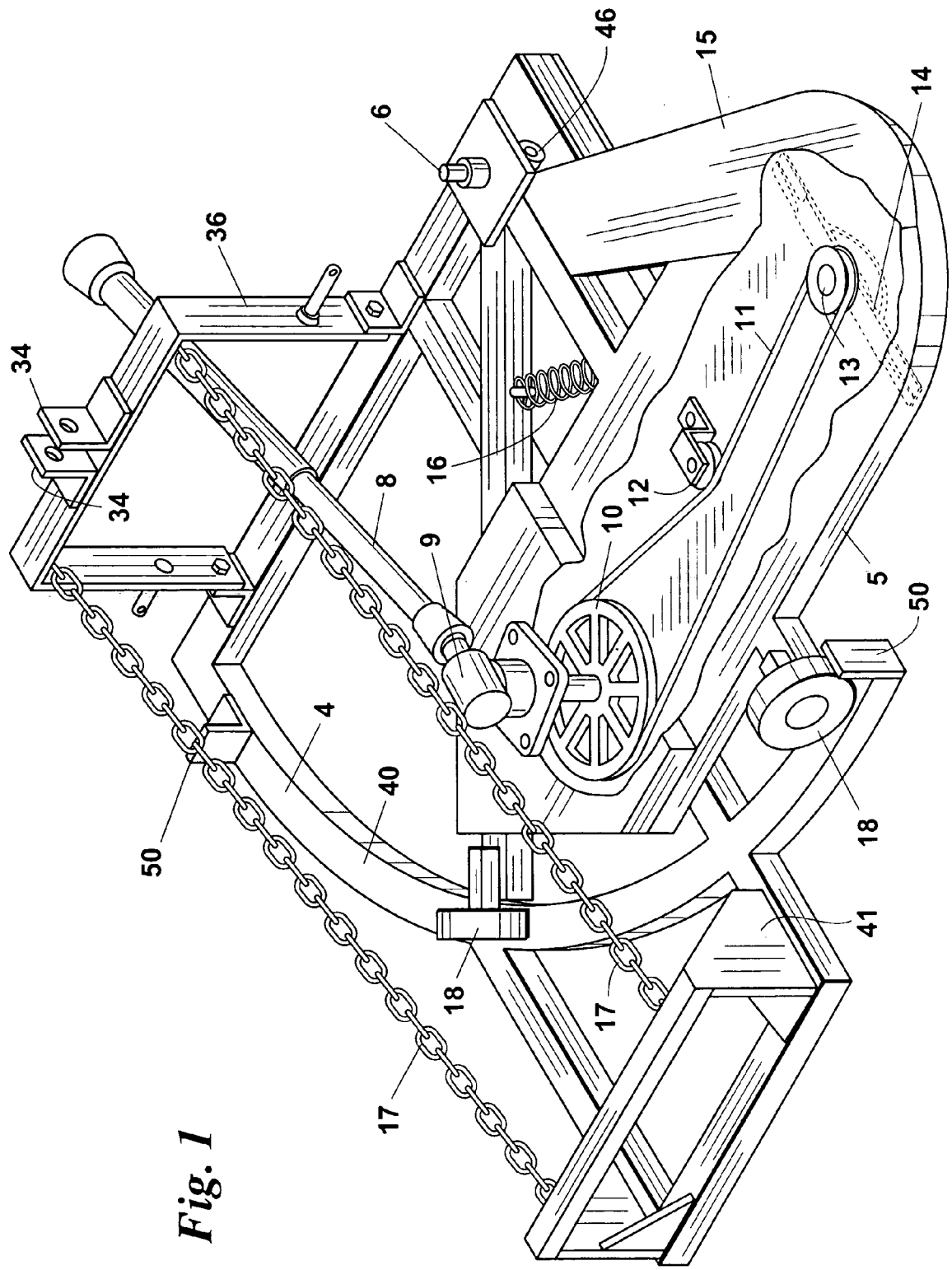
FIG. 1 is a perspective of the cutting attachment itself with certain parts broken away to show details of the pulley system.
Figure 3:
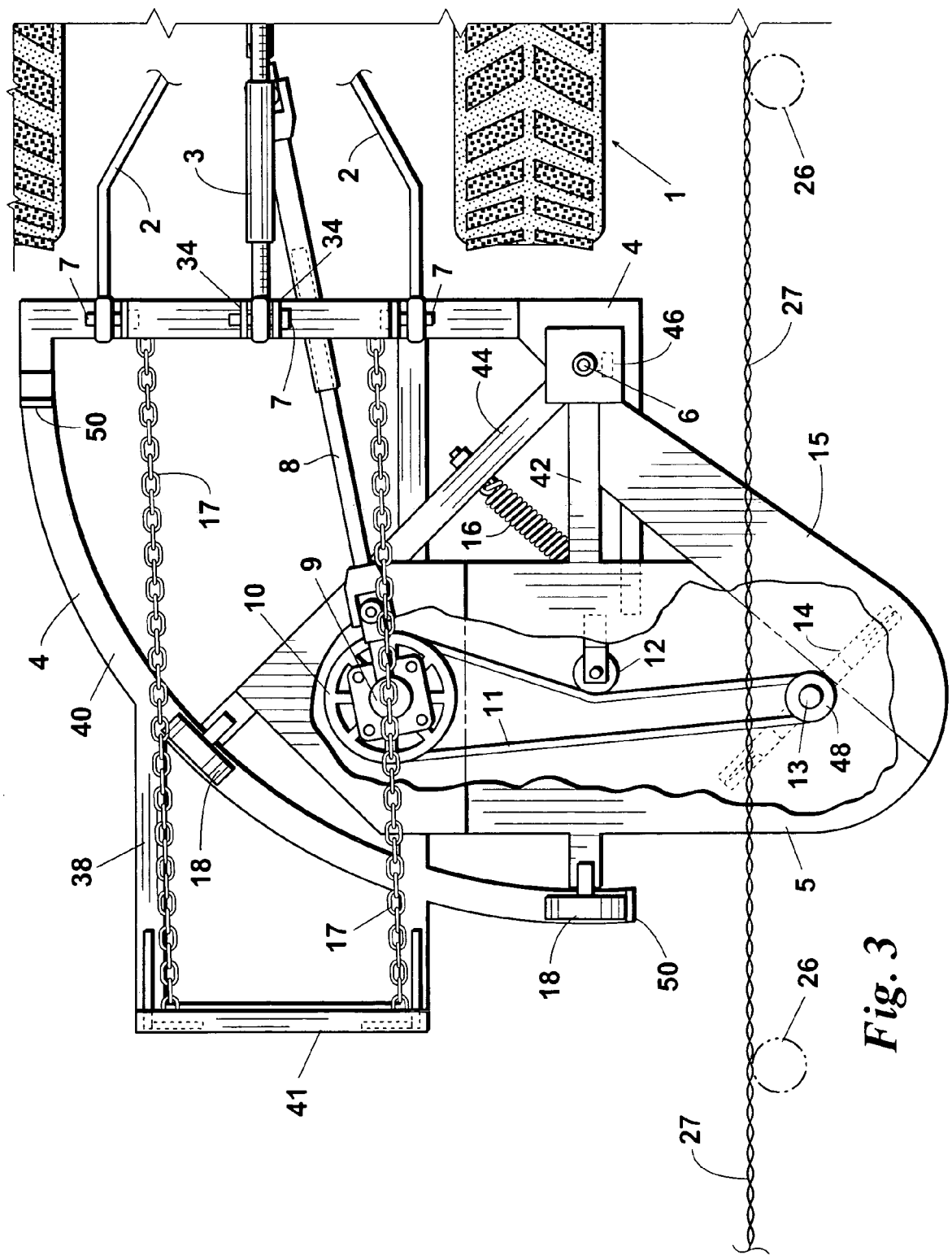
FIG. 3 is a plan view taken from FIG. 2 showing the foremost portion of the pivotal cutting arm extending under the lowermost strand of wire.
Figure 4:
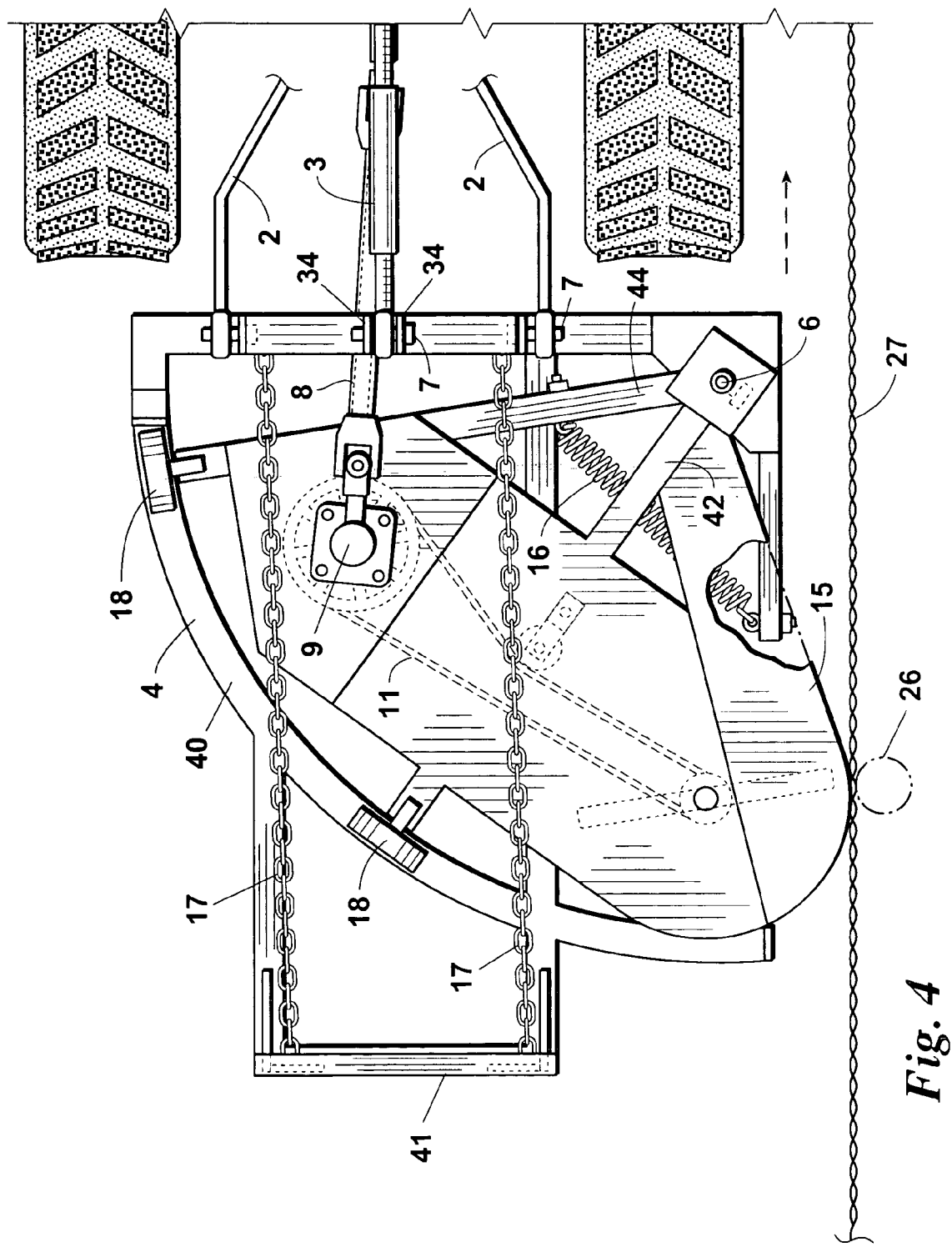
FIG. 4 is a view similar to FIG. 3 but showing what occurs when the swing arm contacts a fence post and how the swing arm pivots until the fence post is cleared.

Referring to the attached drawings in detail, FIGS. 1 through 4 show a fence mower having a base frame 4 which is freely supported on the rear of an agriculture tractor 1. Only the wheels of the tractor are shown in FIGS. 2, 3 and 4, together with a three point hitch which will be described hereinafter.

The three point hitch consists of a pair of lower hitching arms 2 and an upper hitching arm 3 all of which extend from and are connected to the tractor mechanism (not shown) in a conventional manner. The left-hand end of the upper hitching arm 3 is pivotally connected a pair of L-shaped brackets 34 through a pin 7. The brackets 34 are mounted on the top of a vertically oriented C-shaped member 36 which is pivotally mounted at its lower end to the right-hand end of the frame 4. The left-hand ends of the lower hitching arms 2 are connected to the vertical sides of the C-shaped support member 36 by means of pins 7 which extend through the sides of the member 36 and through suitable holes in the ends of the lower hitching arms 2. A generally triangularly shaped swing arm assembly 5 is pivotally connected to the frame 4 by means of pivot pin 6 which extends through the apex of the swing arm assembly 5 and the lower right-hand end of the frame 4.

The left-hand 38 end of the frame 4 is essentially rectangular in shape and is provided at its left-hand end with a vertical bracket 41 which extends upwardly opposite from the C-shaped member 36. A pair of chains 17 extend diagonally from the left hand upper end of the bracket 41 to the upper end of the C-shaped bracket 36. Tightening the chains 17 can be accomplished by turning the hitching arm 3, making the invention totally supported by the tractor.

The frame 4 also includes a curved track 40 which extends for approximately 90 degrees from below the rectangular portion 38 of the frame to the upper right-hand portion of the frame 4. The swing arm 5 is provide with a pair of radial arms 42 and 44 which extend radially outward from the pivot pin 6 to the curved track 40. The outer ends of the arms 42 and 44 are provided with rollers 18 which ride on the surface of the curved tack 40. The right-hand ends of the radial arms 42 and 44 connect with a smaller roller 46 which rides on the upper surface of the frame 4 and supplies full rolling support for the swing arm 5 on the frame 4. Within the swing arm assembly 5 are mounted a drive pulley 10, and a belt 11 which extends around the drive pulley 10 and a smaller pulley 48 mounted on a spindle 13. A blade 14 (which is shown in detail in FIGS. 5 and 6) is mounted at the lower end of the spindle 13 and an idler pulley 12 is conveniently located with in the housing 5 so as to bear against the side of the V-belt 11 to keep the same taut between the pulley 10 and the pulley 48.

For the purpose of rotating the drive pulley 10, this invention utilizes the power take off of the tractor 1 itself, that is, a conventional power take off shaft 8 extends outwardly from the tractor 1 and connects at its left-hand end with a gear box 9 which, in turn, drives the pulley 10 in a conventional manner. As best shown in FIGS. 2 and 3, the fence mower of the present invention is designed such that the swing arm 5 is adapted to project under the lowermost rail (or strand of wire) of the fence in question. The fence mower of the present invention will cut the vegetation between adjacent fence posts. When the swing arm 5 of the present invention contacts a fence post 26 (as will hereinafter appear) the swing arm 5 will swing out of the way and allow the mower to proceed forward around the fence post and then back in as soon as the fence post is cleared.

Referring now the FIGS. 2 and 3, these drawings show the relationship between the cutting mower of the present invention and a wire fence; obviously, the fence need not be made from wire but could be made with horizontal rails of wood or other material. At any event, the fence illustrated consists of a plurality of fence posts 26 separated from each other by conventional distancing and supporting thereon a plurality of strands of wire arranged vertically along the posts 26. For the purposes of this discussion, the lowermost strand of wire 27 is shown spaced above the ground 28. It is understood that the distance of the wire 27 from the ground 28 is always greater than the distance of the wedge nose 15 from the ground 28.

When the operator of the agriculture tractor 1 positions the invention under the fence line using the up and down controls of the tractor to control the operation of the three point hitch (previously described), the operator can drive the tractor parallel to the fence line with the low portion of the swing arm 5 being positioned below the lowermost fence rail 27 or wire strand. A wedge nose 15 on the lower right side of the swing arm 5 extending from the outer curvature of the swing arm 5 to the arm 42 allows for easy positioning of the swing arm 5 under the fence rail 27. As the cutting device moves to the right (in relation to FIG. 3) the wedge arm 15 may contact the fence post 26 and cause the assembly 5 to pivot in a clockwise direction with respect to the pivot pin 6. At this time, the rollers 18 will ride in a clockwise direction on the curved track 40. A pair of small angled members 50 welded to the frame 4 at the ends of the track 40 will serve as stops for the rollers 18.

The arm 44 of the swing arm 5 connects with a spring 16 and to a stationary portion of the frame 4, using one or more conventional turn buckles or eye bolts. As shown in FIG. 4 the portion 15 of the swing arm 5 has engaged the fence post 26 to move the swing arm 5 to its maximum out of the way position with the spring 16 being extended. As the invention moves to the right beyond the position shown in FIG. 4 the spring 16 will cause the swing arm 5 to pivot in a counter clockwise direction so that it returns to the position shown in FIG. 3.

Referring again to FIGS. 1, 2 and 3, and most particularly FIGS. 2 and 3 which show the outermost portion of the swing arm 5 disposed close to the ground 28 and below the lowermost strand of wire 27, with the cutting and dirt removal blade 14 also being below the lowermost strand 27; the reason that the above described physical relation is possible is because the portion of the swing arm 5 which goes beneath the lowermost strand is vertically unobstructed; that is, the drive from the power take off shaft 8 connects with a gear box 9 which is mounted above the swing arm 5 in a position considerable inboard from the portion of the swing arm which goes beneath the wire. The gear box 9 drives the pulley 10 disposed below and also drives the spindle 13 for the rotary blade 14 through the belt drive 11 which extends horizontally outward from the inboard position around the pulley 10 to the outboard position around the spindle 13.

Referring now to FIGS. 5 and 6, the blade 14 is essentially horizontal with a pair of opposite cutting ends 52. It has been discovered that when the fence mower of the present invention is used to cut vegetation beneath the lowermost rail of the fence, an unusually large amount of dirt is frequently encountered. For the purposes of overcoming this problem, the blade 14 in FIG. 5 has been modified slightly by adding a bowed portion 54 underneath the center of the blade.

The bowed attachment 54 acts as a spade, and when rotated with the blade, will remove surface dirt when the blade is low enough that the bowed portion comes in contact with the ground.

Due to the rotation of the blade with the bowed bottom portion, the centrifugal force generated as the bowed portion comes in contact with the ground, removes the ground and deposits the ground materials to the sides and back of the blade due to this centrifugal force.

What is claimed is:

1. A fence mower attached to an agricultural tractor for cutting vegetation and removing dirt under a lowermost rail of a fence line, the fence line including a plurality of spaced apart vertical posts secured in the ground and having a plurality of horizontal rails connecting between the vertical posts, the fence mower comprising in combination:

a. a base frame connected to the tractor by a 3-point hitch assembly and chains so as to be free floating and supported by the tractor;

b. a swing arm assembly mounted on top of the base frame and attached to the base frame by a pivot pin, the swing arm assembly being supported on the base frame by means of rollers, the swing arm assembly extending to one side of the tractor parallel to the ground, thus allowing the swing arm assembly to be positioned under the lowermost rail of the fence;

c. a spring system for urging the swing arm assembly in a given rotary direction with respect to the base frame;

d. the swing arm assembly having a wedged nose of tapered design, whereby, when the fence mower moves forward against a fence post, the wedged nose will engage the fence post and pivot the swing arm assembly in a rotary direction opposite to the given rotary direction and against the action of the spring system, so that the tractor can move past the fence post;

e. a dirt removal and cutting blade rotatably mounted within the swing arm assembly and powered by a power take off from the agricultural tractor for cutting grass and removing dirt under the lowermost rail as the tractor moves forward, the power take off connecting to the dirt removal and cutting blade by means of a horizontal belt so that there is no vertical obstruction between the swing arm assembly and the lowermost rail.

2. A fence mower as set forth in claim 1 wherein the dirt removal and cutting blade is mounted on a rotary spindle and extends on opposite sides of the spindle with the ends of the blade being sharpened.

3. A fence mower as set forth in claim 2 wherein the dirt removal and cutting blade is provided with a bowed portion on its underside and centrally located.

* * * * *